US008888497B2

(12) United States Patent
Farahat et al.

(10) Patent No.: US 8,888,497 B2
(45) Date of Patent: *Nov. 18, 2014

(54) EMOTIONAL WEB

(75) Inventors: Ayman Farahat, Santa Clara, CA (US); Eric Theodore Bax, Pasadena, CA (US); Darshan V. Kantak, Pasadena, CA (US); Tarun Bhatia, Burbank, CA (US); Dipika Bhatia, Simi Valley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 634 days.

This patent is subject to a terminal disclaimer.

(21) Appl. No.: 12/723,400

(22) Filed: Mar. 12, 2010

(65) Prior Publication Data

US 2011/0223571 A1 Sep. 15, 2011

(51) Int. Cl.
*G09B 19/00* (2006.01)
*G06Q 30/02* (2012.01)

(52) U.S. Cl.
CPC ............................... *G06Q 30/02* (2013.01)
USPC .......................................................... 434/238

(58) Field of Classification Search
USPC .................................. 434/236, 238, 322, 323
See application file for complete search history.

(56) References Cited

U.S. PATENT DOCUMENTS

| | | | | |
|---|---|---|---|---|
| 5,754,939 A * | 5/1998 | Herz et al. | ................... | 455/3.04 |
| 6,029,195 A * | 2/2000 | Herz | ............................. | 725/116 |
| 6,099,319 A | 8/2000 | Zaltman et al. | | |
| 6,112,181 A * | 8/2000 | Shear et al. | ................... | 705/7.29 |
| 6,289,234 B1 | 9/2001 | Mueller | | |
| 6,585,521 B1 | 7/2003 | Obrador | | |
| 6,688,890 B2 | 2/2004 | von Buegner | | |
| 2003/0069748 A1 * | 4/2003 | Shear et al. | ....................... | 705/1 |
| 2005/0223237 A1 * | 10/2005 | Barletta et al. | ................ | 713/186 |
| 2005/0289582 A1 * | 12/2005 | Tavares et al. | ................... | 725/10 |
| 2006/0122842 A1 | 6/2006 | Herberger et al. | | |
| 2007/0233622 A1 * | 10/2007 | Willcock | ......................... | 706/16 |
| 2008/0077569 A1 * | 3/2008 | Lee et al. | ........................... | 707/5 |
| 2008/0214903 A1 * | 9/2008 | Orbach | .......................... | 600/301 |
| 2008/0243614 A1 * | 10/2008 | Tu et al. | .......................... | 705/14 |
| 2008/0313130 A1 * | 12/2008 | Hammond et al. | ............... | 707/2 |
| 2009/0083129 A1 | 3/2009 | Pradeep et al. | | |
| 2009/0164131 A1 * | 6/2009 | Jung et al. | ........................ | 702/19 |
| 2009/0198507 A1 * | 8/2009 | Rhodus | ............................. | 705/1 |
| 2009/0271740 A1 * | 10/2009 | Ryan-Hutton et al. | ........ | 715/835 |
| 2009/0281906 A1 * | 11/2009 | Cai et al. | ......................... | 705/26 |
| 2010/0004977 A1 * | 1/2010 | Marci et al. | ...................... | 705/10 |
| 2010/0042403 A1 * | 2/2010 | Chandrasekar et al. | .......... | 704/9 |

(Continued)

OTHER PUBLICATIONS

International Search Report and Written Opinion for App. PCT/US2011/024888, dated Sep. 20, 2011, 9 pp.

(Continued)

*Primary Examiner* — Robert J Utama
(74) *Attorney, Agent, or Firm* — Mauriel Kapouytian Woods LLP; Andrew Noble; James Woods

(57) ABSTRACT

Methods and systems are provided for association of various online elements with emotional states. A set of emotional states may be generated or obtained, and particular online elements may be assigned to particular emotional states of the set, such as with emotional states that are reflected or represented by or in the online elements. Online elements can be of various types, such as, for example, Web sites, blogs, articles, online events, online activities, online messaging, etc. User association or interaction with online emotional state-associated online elements can be used in classifying users into particular emotional states.

18 Claims, 13 Drawing Sheets

(56) References Cited

U.S. PATENT DOCUMENTS

| | | | |
|---|---|---|---|
| 2010/0107075 A1* | 4/2010 | Hawthorne et al. | 715/708 |
| 2010/0153520 A1 | 6/2010 | Daun et al. | |
| 2010/0153848 A1* | 6/2010 | Saha | 715/721 |
| 2010/0262597 A1* | 10/2010 | Han | 707/723 |
| 2011/0225043 A1* | 9/2011 | Bhatia et al. | 705/14.53 |
| 2012/0047447 A1* | 2/2012 | Haq | 715/752 |
| 2012/0084150 A1* | 4/2012 | Nussel et al. | 705/14.55 |
| 2012/0101966 A1* | 4/2012 | van Coppenolle et al. | 706/20 |

OTHER PUBLICATIONS

U.S. Appl. No. 12/723,346, filed Mar. 12, 2010, Bhatia et al.
U.S. Appl. No. 12/723,448, filed Mar. 12, 2010, Bhatia et al.
U.S. Appl. No. 12/723,520, filed Mar. 12, 2010, Kantak et al.

* cited by examiner

600

602 using one or more computers, obtaining and storing a first set of information including a set of emotional states with which online elements may be associated

604 using one or more computers, obtaining and storing a second set of information including information relating to a set of online elements

606 using one or more computers, based at least in part on the second set of information, assigning each of the set of online elements to at least one associated emotional state, of the set of emotional states

608 using one or more computers, obtaining and storing a third set of information including information relating to online activity of a user in association with at least one online element of the set of online elements, and including an emotional state to which the at least one online element of the set of online elements is assigned

610 using one or more computers, based at least in part on the third set of information, classifying the user into at least one emotional state of the set of emotional states

702
using one or more computers, obtaining and storing a first set of information including a set of emotional states with which online elements may be associated 704
using one or more computers, obtaining and storing a second set of information including information relating to a set of online elements, the set of online elements including Internet-based content and events 706
using one or more computers, based at least in part on the second set of information, assigning each of the set of online elements to at least one associated emotional state, of the set of emotional states, including utilizing tagging or labeling in assigning each of the online elements, of the set of online elements, to at least one emotional state, of the set of emotional states, determined to be reflected or represented by the online element of the set of online elements 708
using one or more computers, obtaining and storing a third set of information including information relating to online activity of a user in association with at least one online element of the set of online elements, and including an emotional state to which the at least one online element of the set of online elements is assigned, and including information relating to activities initiated by the user and information relating to content choices of the user 710
using one or more computers, based at least in part on the third set of information, classifying the user into at least one emotional state of the set of emotional states

FIG. 7

EMOTIONAL WEB

BACKGROUND

Targeting of various forms is extremely valuable in online advertising, as well as providing content more generally, and can dramatically enhance advertisement campaign performance and return on investment for online advertising spend. Online, circumstances and behavior of individual users can be tracked very granularly and on an individual user basis, allowing a previously unprecedented level and precision in targeting.

For example, in sponsored search, users are targeting based on, among other things, search queries entered into search engines. The semantics of search queries offers powerful insight into the interests and intentions of particular users, thereby providing a great targeted resource. Online semantics, including keywords appearing in content or documents, user interest categories, etc., are utilized in many ways to enhance relevance and targeting.

Emotional targeting, by contrast, remains a vast, potent, and largely untapped resource on the Web. In dramatically increasing fashion, users are able to express themselves emotionally on the Web. Social networking and real-time interaction provide huge levels of emotionally rich communication. Rich media, including audio and video, provide unprecedented opportunities for users to share their emotions and emotionally charged experiences. Furthermore, if facilitated, tapped, and recognized, direct and indirect online behavioral clues abound regarding users' emotions and emotional patterns.

Emotional state at a given time obviously and powerfully affects human behavior, including online behavior. Yet emotional targeting online remains a dramatically untapped and potent resource.

There is a need for techniques for use in emotional targeting, as well as related and other areas.

SUMMARY

Some embodiments of the invention provide techniques for emotional targeting of online users. In some embodiments, a set of emotional states is generated or obtained that represents various emotional states that a user may be in at a given time. Based in part on a determined emotional state, or likely emotional state, of a user, such as at a particular time or during a particular period, the user can be targeted with an advertisement or content. The advertisement or content can be determined to be likely to perform well based at least in part on the emotional state of the targeted user.

Some embodiments of the invention can include emotional mapping, such as of online users. Furthermore, some embodiments can include emotional Web aspects, including labeling, instrumenting, facilitating, incentivizing and harnessing emotional aspects of elements of the Web. Still further, some embodiments can include emoticlips, including generation, customization, use, and tracking of use thereof, in which an emoticlip can include a rich media segment designed at least to facilitate communication of an emotional state or an emotional experience.

BRIEF DESCRIPTION OF THE DRAWINGS

FIG. 6 is a flow diagram illustrating a method according to one embodiment of the invention;

FIG. 7 is a flow diagram illustrating a method according to one embodiment of the invention;

Figure 1:
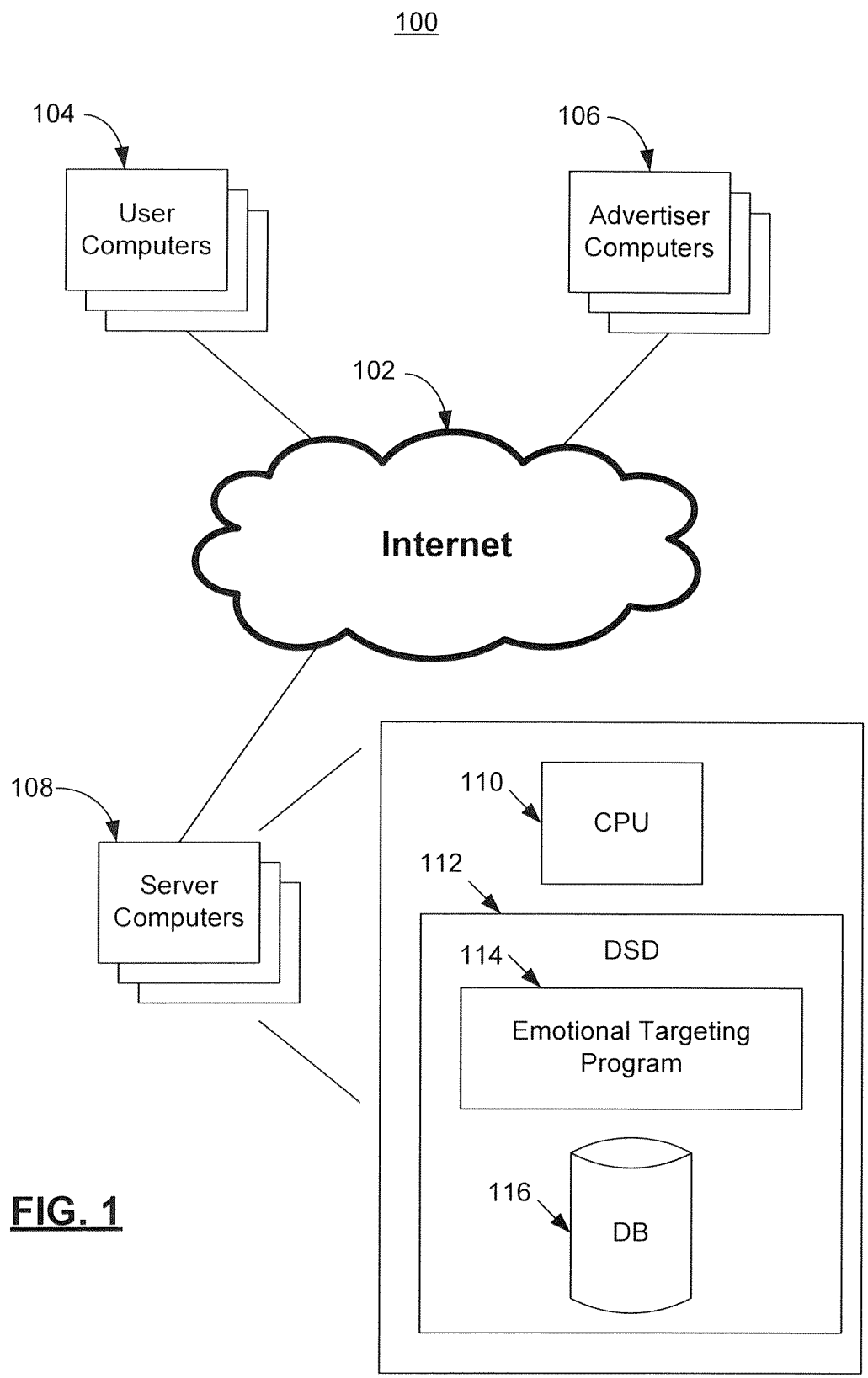
FIG. 1 is a distributed computer system according to one embodiment of the invention.

While the invention is described with reference to the above drawings, the drawings are intended to be illustrative, and the invention contemplates other embodiments within the spirit of the invention.

DETAILED DESCRIPTION

In various embodiments of the invention, methods and systems are provided relating to emotional targeting, emotional mapping, emotional Web aspects, and emoticlips. Various embodiments of all of the foregoing are described in detail herein.

Some embodiments of the invention relate to emotional targeting. In some embodiments of the invention, methods and systems are provided for emotional targeting of online users, including targeting of users with advertisements and content. Techniques are provided in which, based at least in part on online user behavior, a user is classified into one of a set of emotional states. Advertisements or content are targeted to the user based at least in part on an emotional state of the user, or a forecasted, predicted, or likely emotional state of the user, at a particular time or during a particular period of time.

Some embodiments of the invention relate to emotional mapping. In some embodiments, methods and systems are provided for emotional mapping, such as of online users based at least in part on online activities of the users. Techniques are provided in which information including a set of emotional states is generated or obtained, such as a hierarchical network of emotional states representing a spectrum of human emotions. Information regarding user online activities and content choices of a user is obtained. Based at least in part on this information, the user is classified into an emotional state of the set of emotional states, and advertisements or content may be targeted to the user accordingly.

Some embodiments of the invention relate to aspects of the emotional Web. In some embodiments, methods and systems are provided for association of various online elements with emotional states. A set of emotional states may be generated or obtained, and particular online elements may be assigned to particular emotional states of the set, such as with emotional states that are reflected or represented by or in the online elements. Online elements can be of various types, such as, for example, Web sites, blogs, articles, online events, online activities, online messaging, videos, songs, images, etc. User association or interaction with online emotional state-associated online elements can be used in classifying users into particular emotional states.

Some embodiments of the invention relate to emoticlips. In some embodiments, techniques are provided which include generating, providing or obtaining a set of emoticlips. An emoticlip, which may be customizable or personalizable, can include a rich media segment designed at least to facilitate communication of an emotional state or an emotional experience. Particular emoticlips can be associated with emotional states of a set of emotional states. User association with, use of or interaction with an emoticlip, as well as an emotional state associated with the emoticlip, can be used in classifying the user in an emotional state, or in targeting the user with an online advertisement or content, or both.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich media advertisements, video advertisements, etc.

As depicted, each of the server computers 108 includes one or more CPUs 110 and a data storage device 112. The data storage device 112 includes a database 116 and an Emotional Targeting Program 114.

The Program 114 is intended to broadly include all programming, applications, algorithms, software and other tools necessary to implement or facilitate methods and systems according to embodiments of the invention, including emotional targeting, emotional mapping, emotional Web, and emoticlip related embodiments. The elements of the Program 114 may exist on a single server computer or be distributed among multiple computers or devices.

Figure 2:
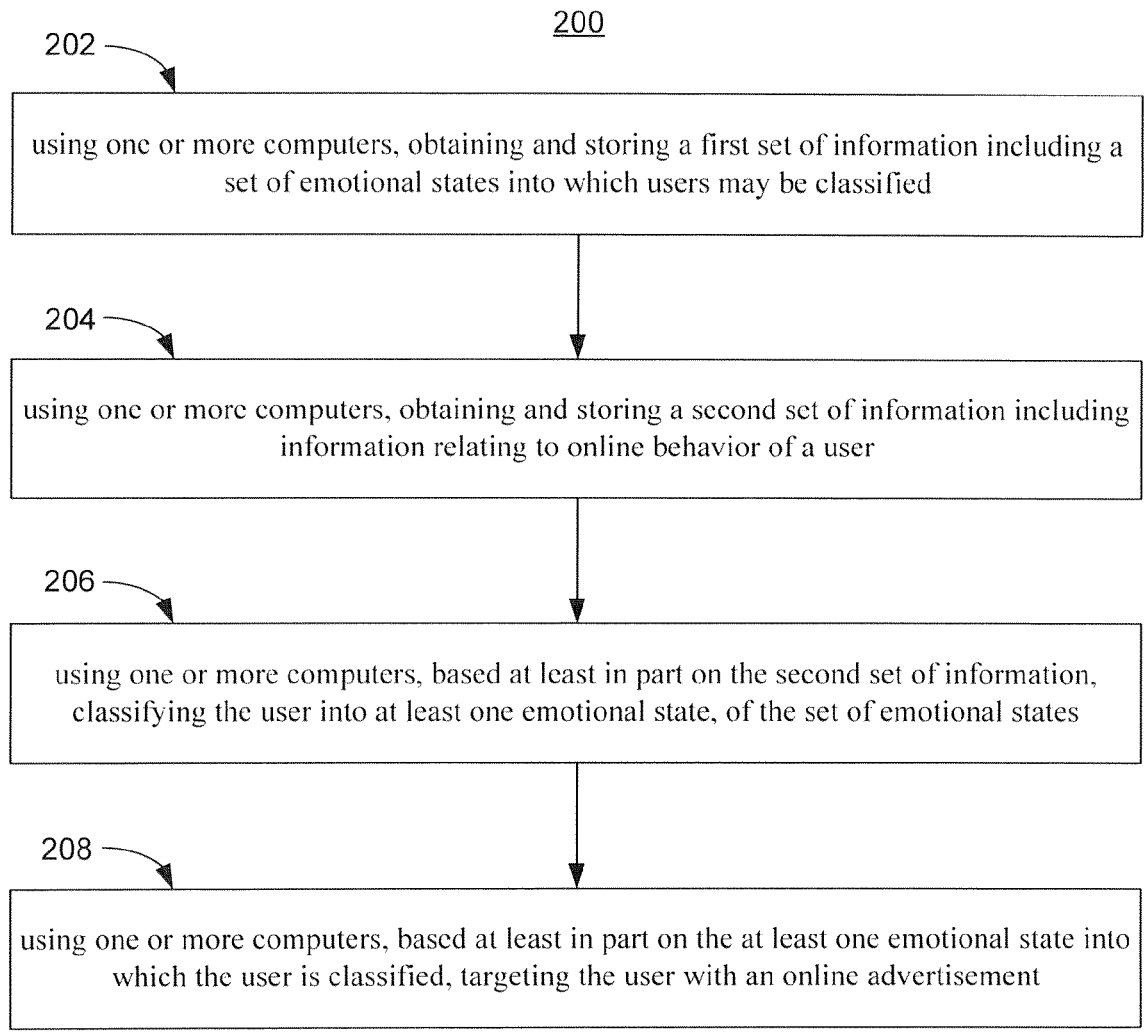
FIG. 2 is a flow diagram illustrating a method according to one embodiment of the invention.

FIG. 2 is a flow diagram of a method 200 according to one embodiment of the invention. At step 202, using one or more computers, a first set of information is obtained and stored, including a set of emotional states into which users may be classified.

At step 204, using one or more computers, a second set of information is obtained and stored, including information relating to online behavior of a user.

At step 206, using one or more computers, based at least in part on the second set of information, the user is classified into at least one emotional state, of the set of emotional states.

At step 208, using one or more computers based at least in part on the at least one emotional state into which the user is classified, the user is targeted with an online advertisement.

Figure 3:
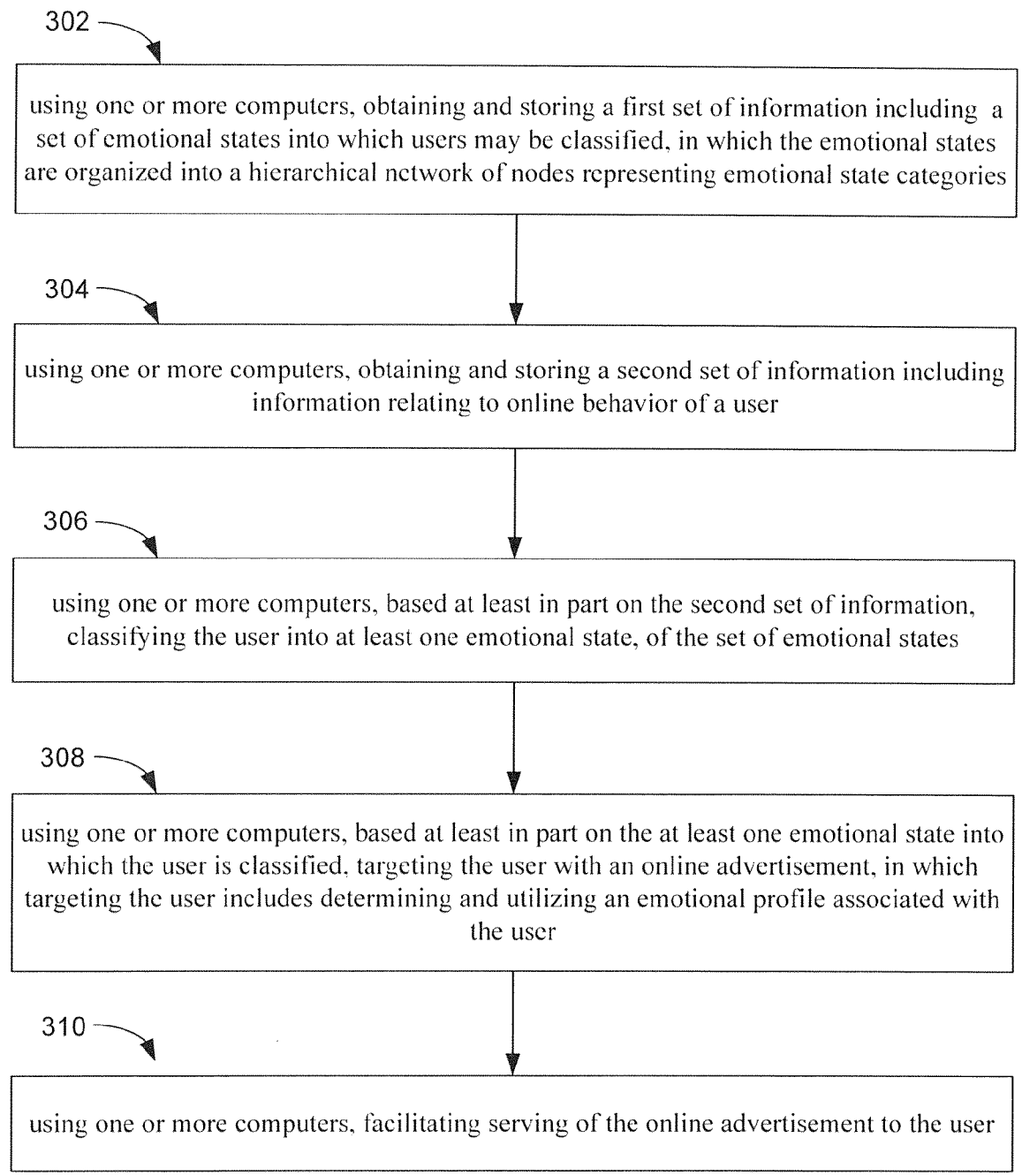
FIG. 3 is a flow diagram illustrating a method according to one embodiment of the invention.

FIG. 3 is a flow diagram 300 illustrating a method according to one embodiment of the invention. At step 302, using one or more computers, a first set of information is obtained and stored, including a set of emotional states into which users may be classified, in which the emotional states are organized into a hierarchical network of nodes representing emotional state categories.

At step 304, using one or more computers, a second set of information is obtained and stored, including information relating to online behavior of a user.

At step 306, using one or more computers, based at least in part on the second set of information, the user is classified into at least one emotional state, of the set of emotional states.

At step 308, using one or more computers, based at least in on the at least one emotional state into which the user is classified, the user is targeted with an online advertisement, in which targeting the user includes determining and utilizing an emotional profile associated with the user.

At step 310, using one or more computers, serving of the online advertisement to the user is facilitated.

Figure 4:
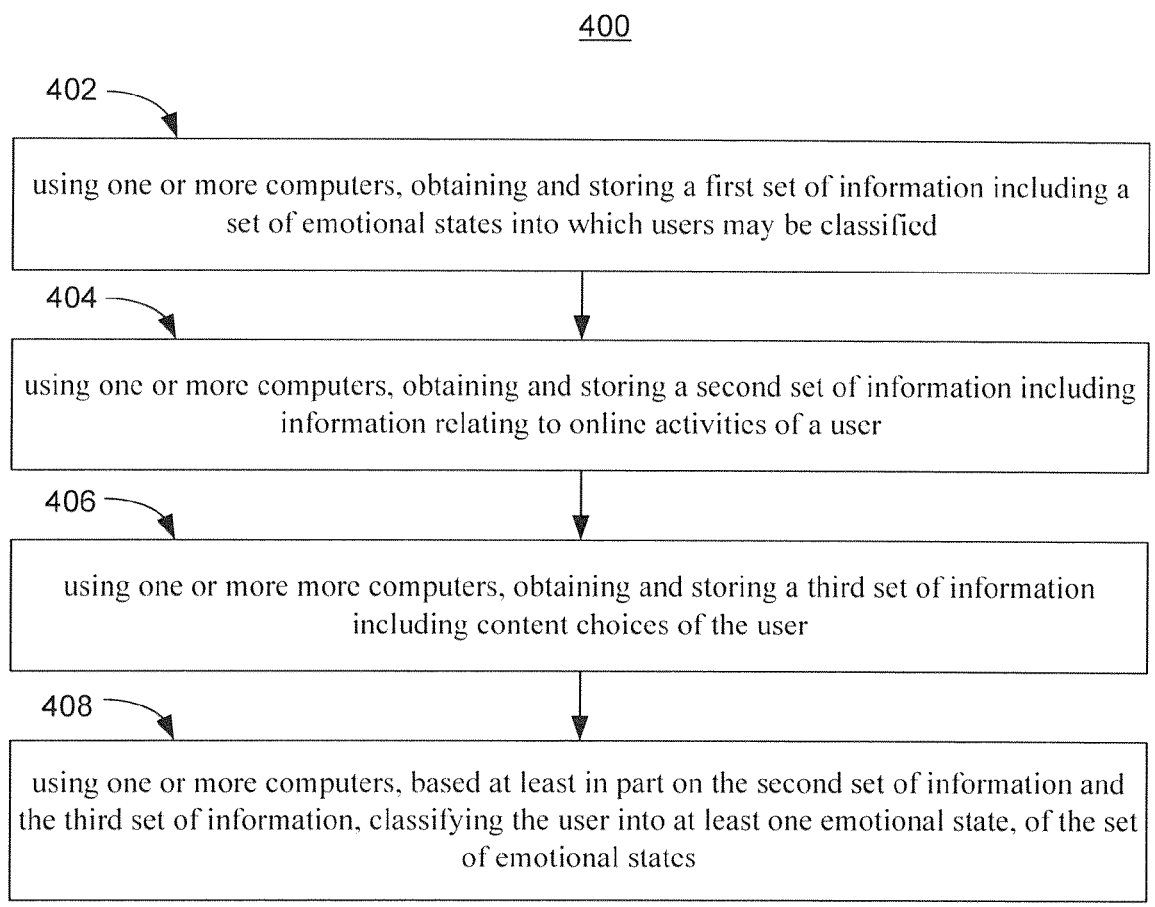
FIG. 4 is a flow diagram illustrating a method according to one embodiment of the invention.

FIG. 4 is a flow diagram 400 illustrating a method according to one embodiment of the invention. At step 402, using one or more computers, a first set of information is obtained and stored, including a set of emotional states into which users may be classified.

At step 404, using one or more computers, a second set of information is obtained and stored, including information relating to online activities of a user.

At step 406, using one or more computers, a third set of information is obtained and stored, including content choices of the user.

At step 408, using one or more computers, based at least in part on the second set of information and the third set of information, the user is classified into at least one emotional state, of the set of emotional states.

Figure 5:
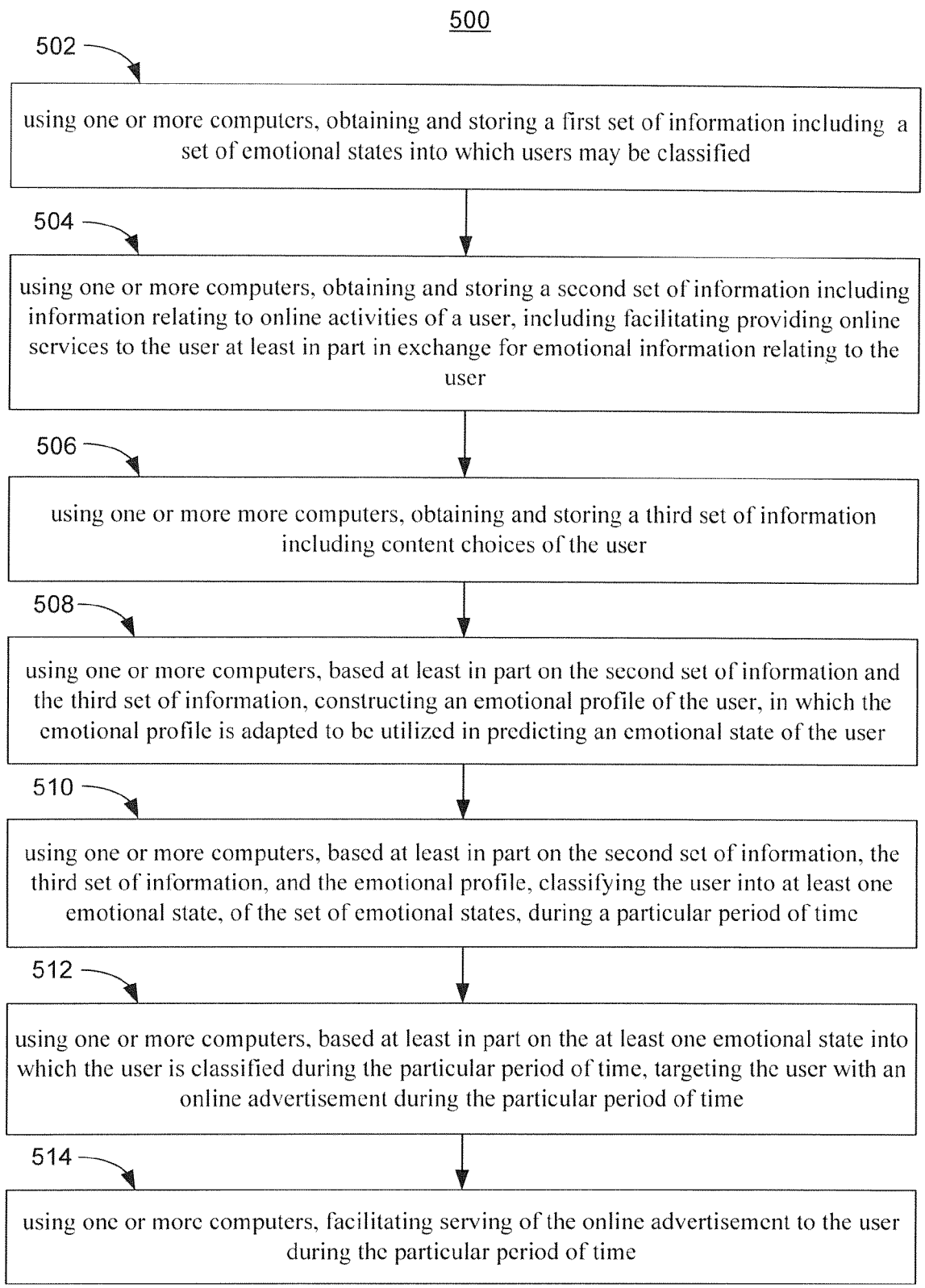
FIG. 5 is a flow diagram illustrating a method according to one embodiment of the invention.

FIG. 5 is a flow diagram 500 illustrating a method according to one embodiment of the invention. At step 502, using one or more computers, a first set of information is obtained and stored, including a set of emotional states into which users may be classified.

At step 504, using one or more computers, a second set of information is obtained and stored, including information relating to online activities of a user, including facilitating providing online services to the user at least in part in exchange for emotional information relating to the user.

At step 506, using one or more computers, a third set of information is obtained and stored, including content choices of the user.

At step 508, using one or more computers, based at least in part on the second set of information and the third set of information, an emotional profile of the user is constructed, in which the emotional profile is adapted to be utilized in predicting an emotional state of the user.

At step 510, using one or more computers, based at least in part on the second set of information, third set of information, and the emotional profile, the user is classified into at least one emotional state, of the set of emotional states, during a particular period of time.

At step 512, using one or more computers, based at least in part on the at least one emotional state into which the user is classified during the particular period of time, the user is targeted with an online advertisement during the particular period of time.

At step 514, using one or more computers, serving is facilitated of the online advertisement to the user during the particular period of time.

FIG. 6 is a flow diagram 600 illustrating a method according to one embodiment of the invention. At step 602, using one or more computers, a first set of information is obtained and stored, including a set of emotional states with which online elements may be associated.

At step 604, using one or more computers, a second set of information is obtained and stored, including information relating to a set of online elements.

At step 606, using one or more computers, based at least in part on the second set of information, each of the set of online elements is assigned to at least one associated emotional state, of the set of emotional states.

At step 608, using one or more computers, a third set of information is obtained and stored including information relating to online activity of a user in association with at least one online element of the set of online elements, and including an emotional state to which the at least one online element of the set of online elements is assigned.

At step 610, using one or more computers, based at least in part on the third set of information, the user is classified into at least one emotional state of the set of emotional states.

FIG. 7 is a flow diagram 700 illustrating a method according to one embodiment of the invention. At step 702, using one or more computers, a first set of information is obtained and stored, including a set of emotional states with which online elements may be associated.

At step 704, using one or more computers, a second set of information is obtained and stored, including information relating to a set of online elements, the set of online elements including Internet-based content and events.

At step 706, using one or more computers, based at least in part on the second set of information, each of the set of online elements is assigned to at least one associated emotional state, of the set of emotional states. Step 706 includes utilizing tagging or labeling in assigning each of the online elements, of the set of online elements, to at least one emotional state, of the set of emotional states, determined to be reflected or represented by the online element of the set of online elements.

At step 708, using one or more computers, a third set of information is obtained and stored, including information relating to online activity of a user in association with at least one online element of the set of online elements, and including an emotional state to which the at least one online element of the set of online elements is assigned, and including information relating to activities initiated by the user and information relating to content choices of the user.

At step 710, using one or more computers, based at least in part on the third set of information, the user is classified into at least one emotional state of the set of emotional states.

Figure 8:
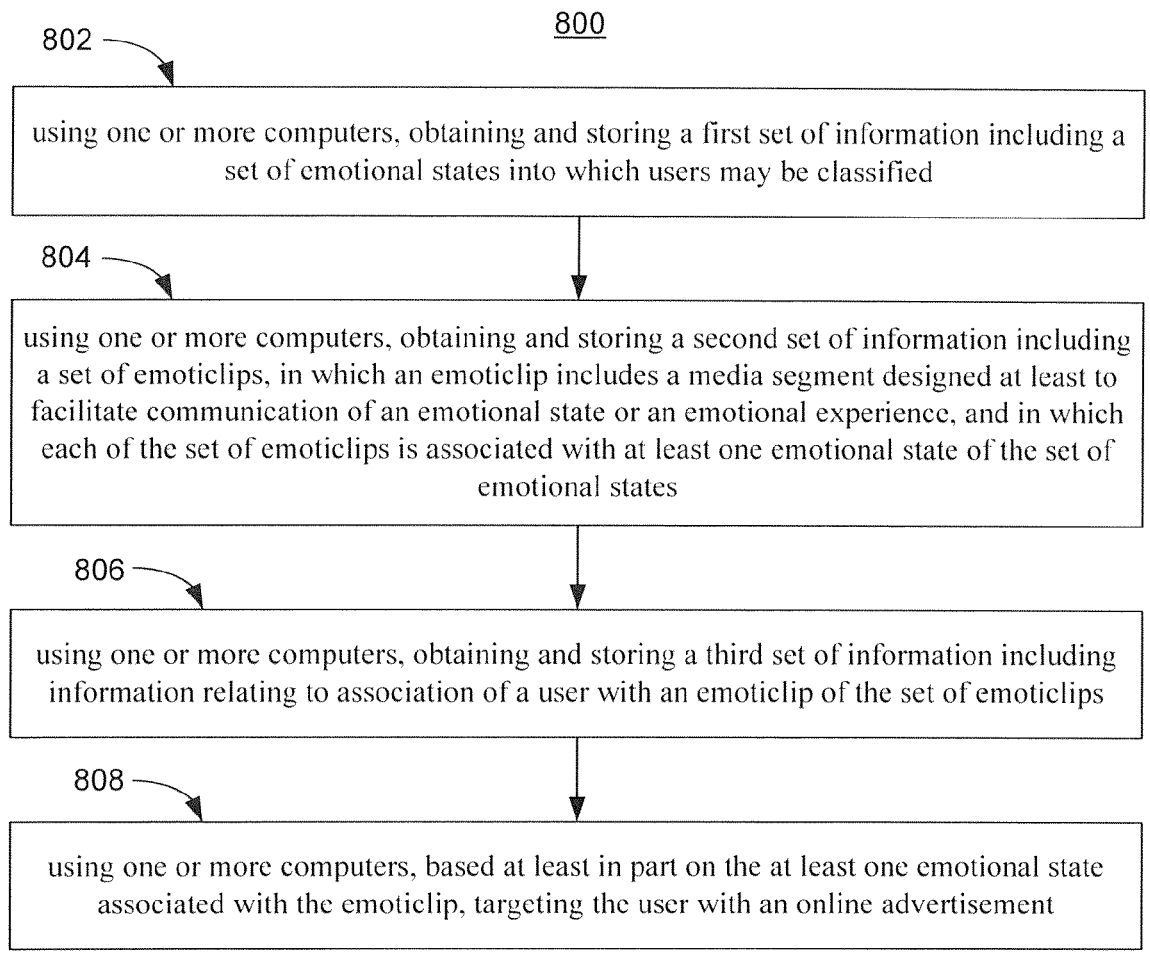
FIG. 8 is a flow diagram illustrating a method according to one embodiment of the invention.

FIG. 8 is a flow diagram 800 illustrating a method according to one embodiment of the invention. At step 802, using one or more computers, a first set of information is obtained and stored, including a set of emotional states into which users may be classified.

At step 804, using one or more computers, a second set of information is obtained and stored, including a set of emoticlips, in which an emoticlip includes a media segment designed at least to facilitate communication of an emotional state or an emotional experience. Each of the set of emoticlips is associated with at least one emotional state of the set of emotional states.

At step 806, using one or more computers, a third set of information is obtained and stored, including information relating to association of a user with an emoticlip of the set of emoticlips.

At step 808, using one or more computers, based at least in part on the at least one emotional state associated with the emoticlip, the user is targeted with an online advertisement.

Figure 9:
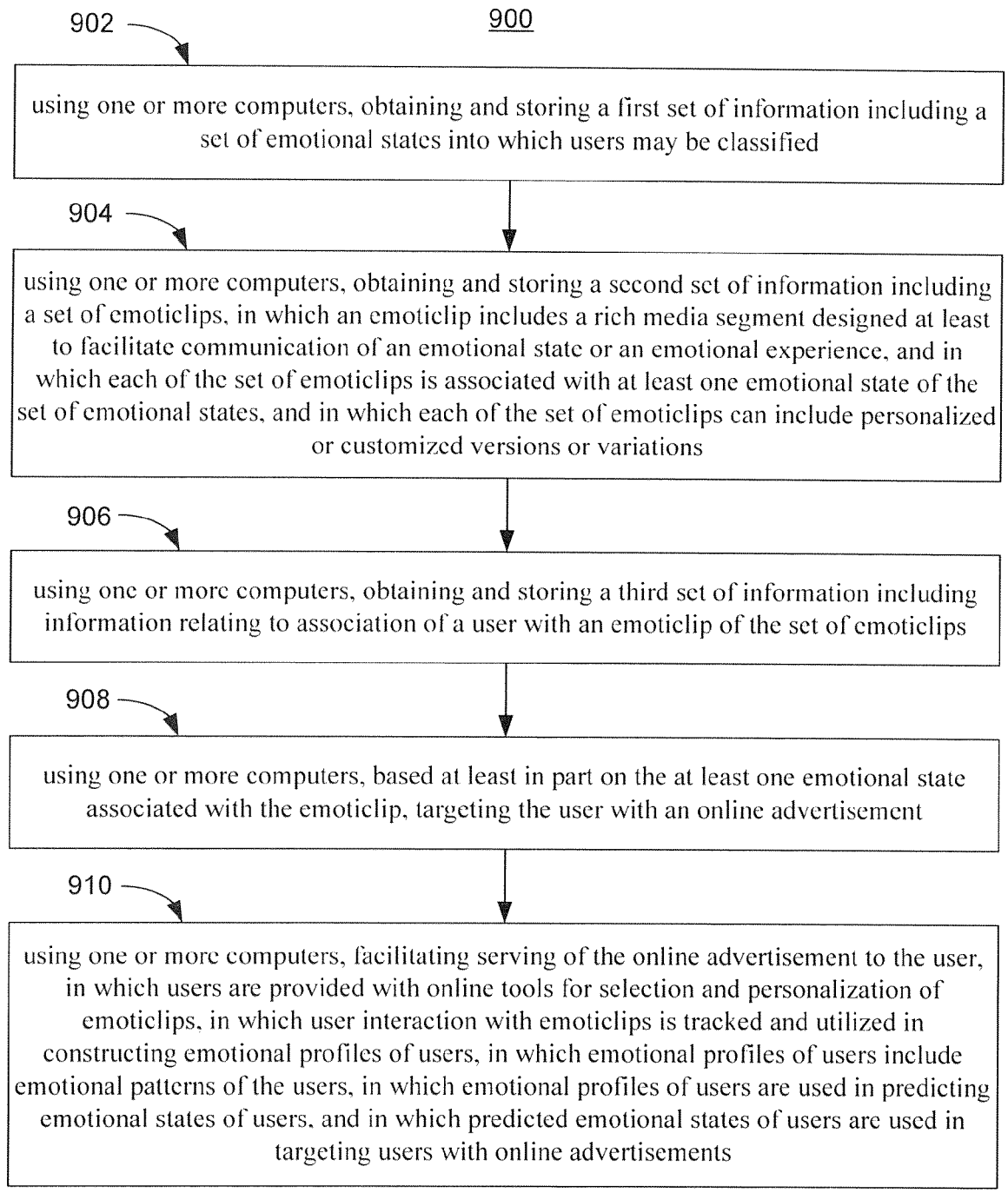
FIG. 9 is a flow diagram illustrating a method according to one embodiment of the invention.

FIG. 9 is a flow diagram 900 illustrating a method according to one embodiment of the invention. At step 902, using one or more computers, a first set of information is obtained and stored, including a set of emotional states into which users may be classified.

At step 904, using one or more computers, a second set of information is obtained and stored, including a set of emoticlips, in which an emoticlip includes a rich media segment designed at least to facilitate communication of an emotional state or an emotional experience. Each of the set of emoticlips is associated with at least one emotional state of the set of emotional states. Furthermore, each of the set of emoticlips can include personalized or customized versions or variations.

At step 906, using one or more computers, a third set of information is obtained and stored, including information relating to association of a user with an emoticlip of the set of emoticlips.

At step 908, using one or more computers, based at least in part on the at least one emotional state associated with the emoticlip, the user is targeted with an online advertisement.

At step 910, using one or more computers, serving is facilitated of the online advertisement to the user. Users are provided with online tools for selection and personalization of emoticlips. User interaction with emoticlips is tracked and utilized in constructing emotional profiles of users. Emotional profiles of users include emotional patterns of users. Emotional profiles of users are used in predicting emotional states of users. Predicted emotional states of users are used in targeting users with online advertisements.

Figure 10:
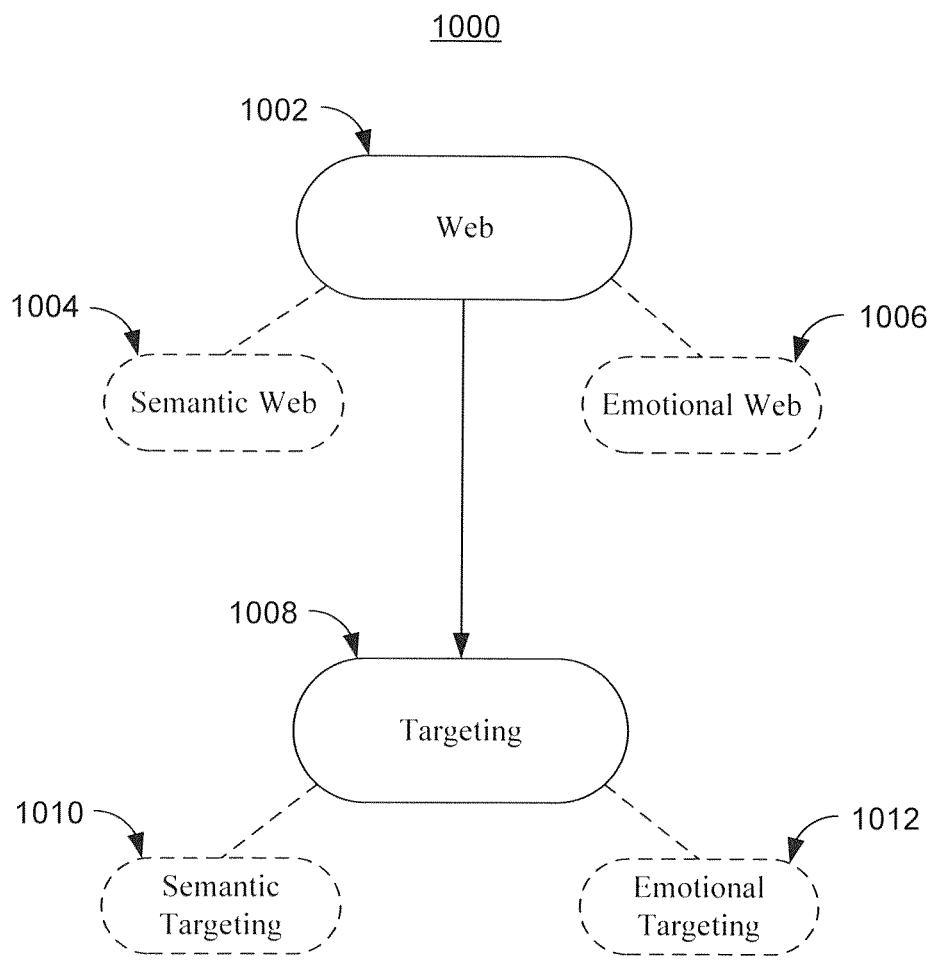
FIG. 10 is a block diagram illustrating one embodiment of the invention.

FIG. 10 is a block diagram 1000 illustrating one embodiment of the invention. FIG. 10 includes a depiction of the Web 1002, including the Internet. The Web 1002 is conceptually depicted as including aspects including the semantic Web 1004 and the emotional Web 1006. Block 1008 represents online or Web-based targeting. Block 1010 represents semantic aspects of targeting, while block 1012 represents emotional aspects of targeting.

Generally, some embodiments of the invention include a recognition of the powerful, growing, and largely untapped emotional Web. Embodiments of the invention include techniques and instrumentation for harnessing emotional Web elements and signals, and using them in targeting users. While emotional states may be described or categorized semantically, underlying this semantic level are emotional states.

Figure 11:
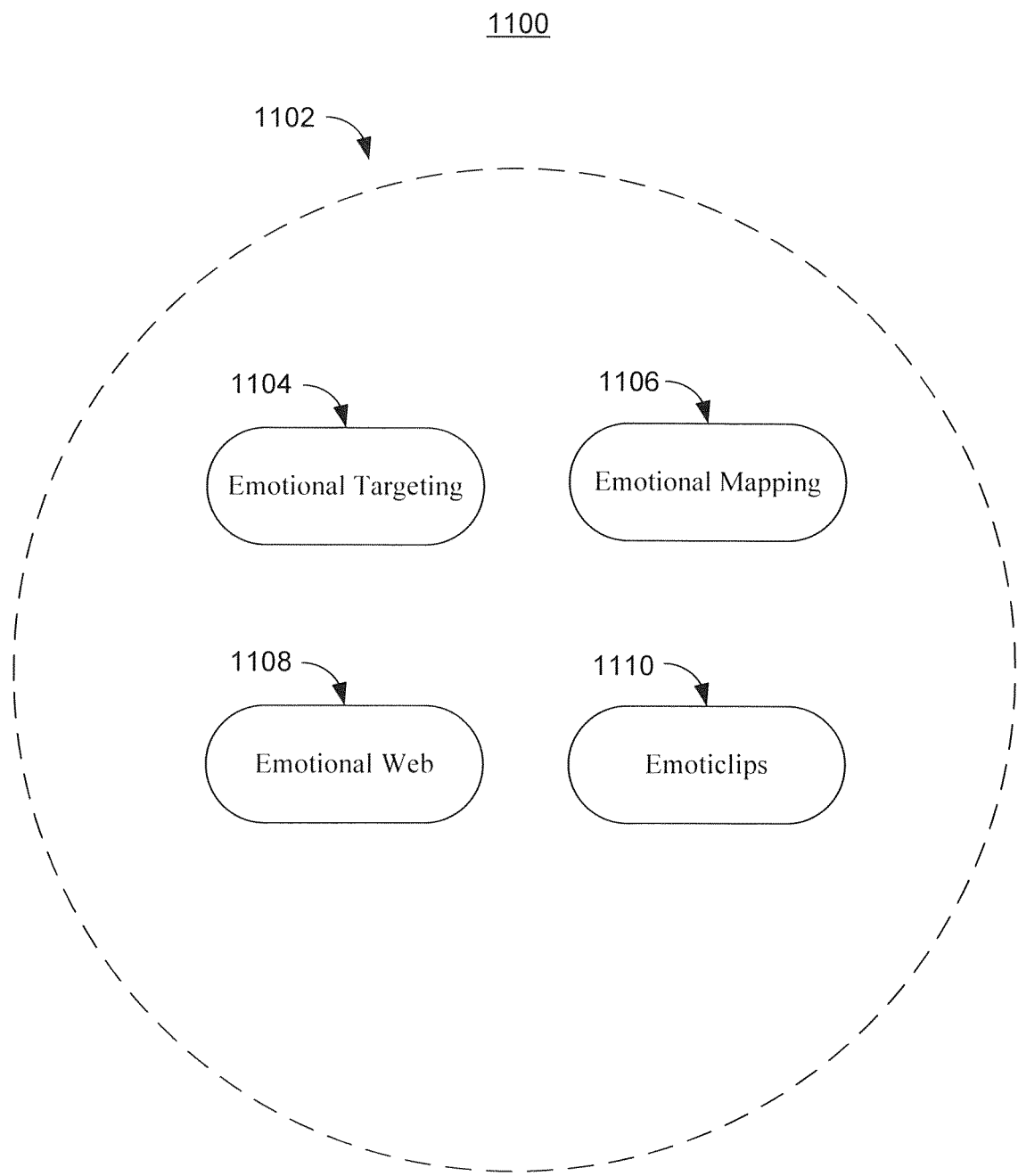
FIG. 11 is a block diagram illustrating one embodiment of the invention.

FIG. 11 is a block diagram 1100 illustrating one embodiment of the invention. Broken circle 1102 represents emotional elements of techniques according to some embodiments of the invention, as described in detail herein. Particularly, emotional targeting elements are represented by block 1104, emotional mapping elements are represented by block 1106, emotional Web elements are represented by block 1108, and emoticlip elements are represented by block 1110. In various embodiments of the invention, individual emotional elements 1104-1110 can be used independently or in various combinations, including integrated and seamless combinations.

Figure 12:
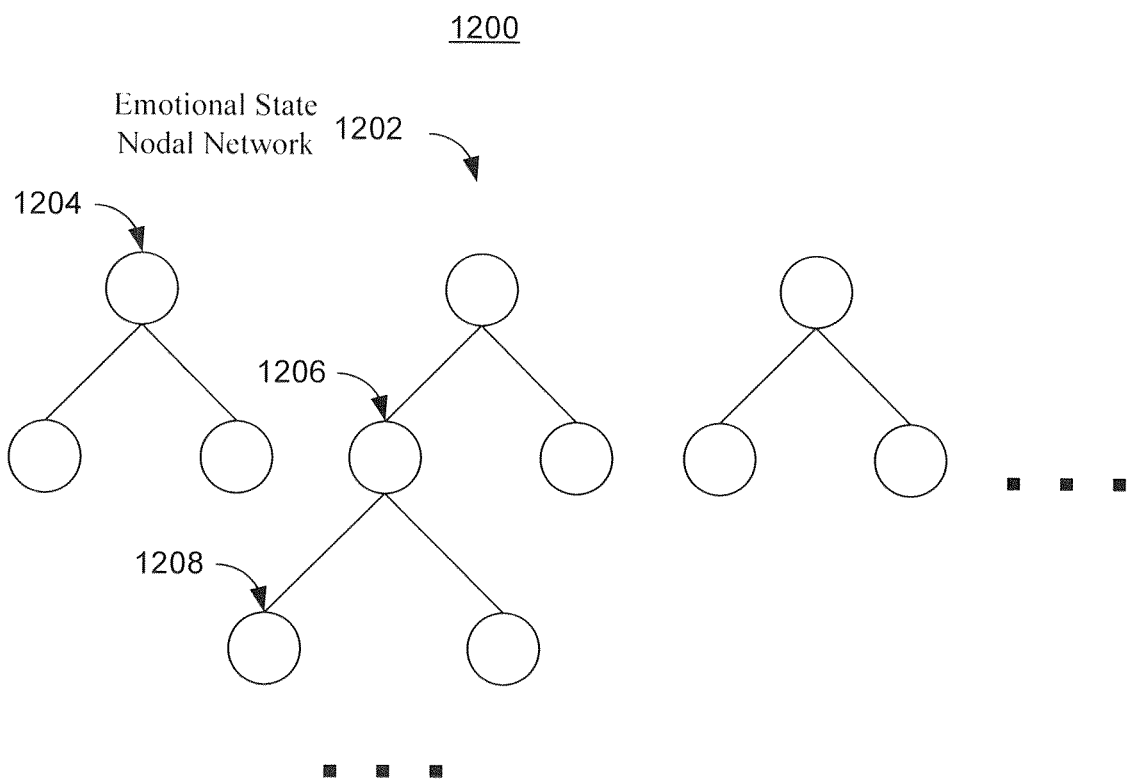
FIG. 12 is a block diagram illustrating one embodiment of the invention.

FIG. 12 is a block diagram 1200 illustrating one embodiment of the invention. An emotional state nodal network

1202, according to one embodiment, is depicted. As depicted, each highest level node, such as node 1204, can represent a particular high level or broad human emotion, of a spectrum of human emotions. As one example, node 1204 could represent happiness. The network 1202 may also include various levels of subnodes, which can be subcategories or subsets of higher level nodes. For example, subnode 1208 and other subnodes could represent, respectively, more granular emotional states such as joy, placidity, contentment, exuberance, etc., which may be subsets of or otherwise related to associated higher level nodes, such as the happiness node 1204.

Figure 13:
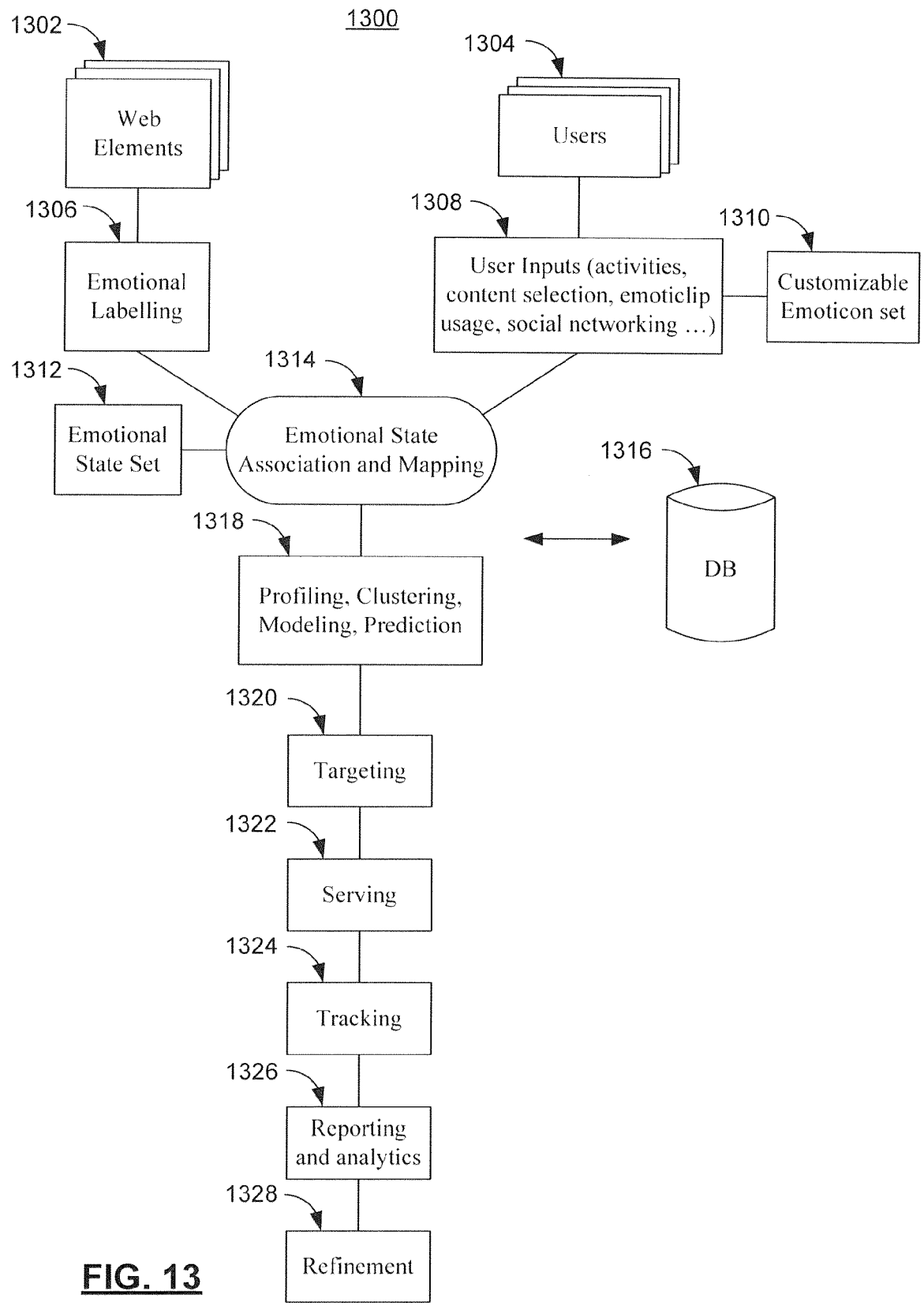
FIG. 13 is a block diagram illustrating one embodiment of the invention.

FIG. 13 is a block diagram 1300 illustrating one embodiment of the invention. Some of the blocks depicted in the diagram 1300 generally and broadly represent aspects of embodiments of the invention. While depicted separately, it is to be understood that the various aspects can interact, be combined, integrated, etc. It is further to be understood that the aspects depicted in the diagram 1300 are not intended to be comprehensive, but merely representative of some features of some embodiments of the invention. Furthermore, while associations between some blocks are depicted by lines, it is to be understood that associations can exist between any of the blocks and aspects.

Information represented by or obtained at any of the blocks may be stored in one or more databases, such as database 1316.

As depicted in the diagram 1300, block 1302 represents Web elements. Web elements can broadly include, for example, Web sites, blogs, articles, online events, online activities, online messaging, etc.

Block 1304 represents online users. While depicted separately from Web elements 1302, in some embodiments, users themselves can be or be part of Web elements 1302.

Block 1306 represents emotional labeling, tagging, mapping, etc. of online elements, such as to particular emotional states.

Block 1308 represents any of various user inputs, whether direct or indirect, which provide information from which emotional state information regarding the user may be derived. Such inputs, which can be monitored, tracked and stored, can include any of various user behavior, activities, actions, content selections, etc. In some embodiments, generation of use of, interaction with, or association with emoticlips, as depicted by block 1310, which can include customized, personalized or added-to emoticlips, can be a very useful form of input.

Block 1314 broadly represents various types of emotional state association or emotional mapping, such as association or mapping performed using information associated with block 1306 and 1308, including emotional mapping, Web elements, emotional Web, and user input information. As just a few examples of many possible examples and types of associations, block 1314 can include association of a particular emotional state with a particular emoticlip, association of an emotional state with a user based on interaction of the user with the emoticlip, association of an emotional state with an online element such as an article or blog based on its content, association of a user with an emotional state that the user is or is predicted to be in, etc.

Block 1312 represents a set of emotional states, such as may be formulated as a network of nodes, which can include a hierarchical categorical network of nodes, in which nodes can represent particular emotional states of varying levels of granularity. The set of emotional states represented by block 1312 can be used in emotional associations and emotional mapping as represented by block 1314. For example, emotional associations can be made in accordance with or in correspondence with emotional states of the set of emotional states.

Block 1318 represents any, of various uses, actions, functions and features based at least in part on information obtained from any of the foregoing described blocks 1302-1314, as well as potentially any other block. Uses or features can include use of machine learning techniques, structured or unstructured learning techniques, probabilistic or stochastic techniques, indexing techniques, etc., for example. Furthermore, uses or features can include, for example, emotional profiling or patterning of users or Web elements; clustering, such as of users or Web elements, such as in accordance with emotional patterns or profiles; emotional modeling, such as in connection with or using emotional profiles; prediction or forecasting, such as of emotional patterns, future user emotional states, their probabilities, etc.

Block 1320 represents targeting of users, such as with advertisements, content, or other online or offline products or services, etc., based at least in part on emotional information such as, for example, information obtained or determined at block 1318.

Block 1322 represents serving, of advertisements or content, for example, based at least in part on targeting information obtained at block 1320.

Block 1324 represents tracking and storage of information relating to serving at block 1322, as well as downstream events associated with or which may be determined to be associated with, the serving, such as advertisement performance, user behavior, downstream conversions or purchases, etc.

Block 1326 represents reporting, analytics, and associated information, based or derived at least in part on the tracking information from block 1324. For example, such reporting and analytics can include user behavior and advertisement performance information and metrics, as well as associated emotional state information, to entities such as advertisers or publishers.

Block 1328 represents refinements based at least in part on the reporting, analytics, and other feedback information obtained from block 1326. For example, advertisers can use reporting and analytics information, including associated emotional state information, to refine their advertisements, advertising campaigns, or targeting efforts. Publishers could use reporting and analytics information in refining content, such as to better match emotional states of users based on emotional states of successful advertisements, as just one example. Advertisement marketplace or serving facilitator entities could use reporting and analytics information in various ways, including better optimization of advertisement matching or ranking, better optimized advertiser pricing, etc.

As indicated above, some embodiments of the invention relate emotional targeting. Some embodiments include classifying users into emotional states, such as standard emotional states. Some embodiments further include allowing advertisers, such as brand advertisers, to target associated advertisements to users in particular emotional states. Such emotional targeting can be complementary to various other forms of targeting, including known techniques of behavioral targeting, demographic targeting, geotargeting, etc. Emotional profiles of users can be constructed, for example, to help inform advertisers of the most effective emotional associations with their products, services, brands or campaigns. Some embodiments of the invention provide emotional targeting techniques that allow advertisers to more naturally express and precisely direct their marketing efforts in terms of emotional associations when advertising online.

Some embodiments include a recognition that brand advertisers leverage emotional appeal for building brand associations within the minds of their prospects and customers. Advertisers often spend substantial resources to affirm and confirm the right emotions (trust, comfort, luxury, fond memories, joy, bliss, etc.). Yet there has been no effective mechanism, either offline or online, that, for instance, quantifies and allows marketing efforts to be expressed, and feedback measured, effectively in terms of human emotions. Providing effective direct emotional targeting is possible, if users' emotional expressions can be captured or captured more directly, or estimated against standardized forms based on their direct and indirect activities, either online or offline. Processing such signals can facilitate assigning users to various emotional states, which are then targetable by advertisers.

Some embodiments of the invention include a recognition that brand advertisers appeal to the emotional profile of users. However, simple emotional association with specific domains and content is not very effective. Yet, online advertising offers individualized information and instrumentation for direct feedback. This creates a unique opportunity for emotional targeting, and for delivering advertisements aimed at building the right associations, personalized per user.

Some embodiments further include a recognition that users are getting more social, expressive, and open on the Web. As such, an opportunity exists to assess to their emotional profiles, which can include emotional biases, sensitivities, patterns, etc., like never before. It has become possible to assess a user's current emotional state with an unprecedented level of confidence, based, for example, on numerous direct and indirect events that can be generated both online and offline.

Furthermore, brand advertisers are interested in what emotions customers associate with their brands, and the emotional states that lend favorability to their brands. With such information, advertisers can better target and tune their marketing campaigns. Some embodiments of the invention effectively provide such information.

For instance, a camera company could target advertisements to users that are currently reminiscing about fond memories. Some embodiments allow determination of such an emotional state based on, for example, emotional patterns. Furthermore, in some embodiments, emoticlips, as described in detail herein, can be used in part in this regard. For example, information relating to usage of a "fond memories" emoticlip can be utilized, such as how many users it was shared with, etc. Furthermore, other information or inputs can be factored in, such as the types of searches and Web pages visited, the frequency of activity or certain types of activities relative to normal to the user, etc.

In some embodiments of the invention, to facilitate techniques as described herein, an emotional dimension can be created. Such an emotional dimension could include, for example, a list, or network, of standard nodes in a pool of emotional states, or a hierarchically organized set of emotional nodes at various levels of refinement or granularity. Events or other Web elements, such as Web sites or pages, emoticons, or emoticlips according to embodiments of the invention, can be classified or assigned to emotional nodes, such as using a probability distribution function. In some embodiments, weights can be assigned to user activity levels, and can be used in determining the most likely emotional state of the user. This information can be used, along with other attributes, in determining a more effective advertisement to serve, and to allow advertisers to target users in particular emotional states.

In some embodiments, a user's emotional profile is determined or estimated based at least in part on direct and indirect user inputs including activities. Direct activities could include, among various other things, usage, usage frequency, extent of personalization, and sharing of, for example, tracked emoticons and emoticlips according to embodiments of the invention. Indirect activities could include, among various other things, visits to and engagements with specific domains and Web sites, including, for example, posts, reviews, blog entries, thumbs up, etc. In some embodiments, determined emotional states can be coarse at first and refined over time based on user activity, market activity, etc.

In some embodiments, pricing in an online advertising marketplace or exchange can be affected by emotional targeting considerations or factors. Furthermore, in some embodiments, advertising products are available to advertisers based at least in part on emotional states or emotional targeting factors. In some embodiments, advertising products available to advertisers are priced based at least in part on emotional factors, and can be strategically bundled or otherwise managed, for example, to avoid "cherry-picking" of emotional states or factors by advertisers.

In some embodiments, advertisers can target users based on a user's determined or predicted emotional state. Furthermore, advertisers are able to create particular campaigns around particular emotional states, such as "happy", "reminiscent" and "lonely" campaigns, for instance, including specific advertisements to serve to users in such states.

Some embodiments include providing instrumentation to facilitate such things as new digital events that reveal emotions, beaconing to count such activity, generation of user logs with emotional events, and analysis of these over time. In some embodiments, serving and related functions or engines are updated or informed, for example, to receive the most likely emotional state or states of a user visiting a page, among various other information, and this information is used in functions such as advertisement selection, bid adjustment, ranking, pricing, etc. A prediction function could also leverage the new emotional signal, based on such things as user inputs, emoticlips, personalizations, and correlations between emotional states and world events, for example, to gauge sensitivity and bias in emotional profiles of users.

In some embodiments, the new dimension of emotion is utilized to manage yield. This new dimension can rely on "digitizing" emotional expression in much more powerful and innovative ways ("emotional bytes"), compelling or incentivizing usage, for example, from logged in user sessions, and being able to normalize the emotional space. Normalization can, for example, allow for accounting for personal biases and sensitivities when assigning most likely emotional states for a user.

In some embodiments, algorithms are used in classifying a user to a most likely standardized emotional state, regardless of culture, language or religion. A user's emotional fabric could be estimated from these few emotional states. Emotions are relatively few and shared across humanity; their expressions and associations are much varied, but commonly shared within religions, cultures and small groups. All of this information can be exploited in offering unprecedented personalized digital emotional expressions online, as a mechanism to be able to offer emotional targeting. Furthermore, in some embodiments, services can be provided to allow users to unify and search their "world", including their activities and interactions online, across platforms, devices, portals, etc. This can provide, and allow tracking of, further signals into what the user cares about and how it relates to the user's emotional profile.

In some embodiments, a next likely emotional state of a user is predicted, given the sequence of emotional patterns exhibited by the user over time. This can allow better user response prediction and help elicit the greatest response from emotionally targeted advertising. Sensitivity profiles can also be created for users, to determine or predict how many advertisements or advertisement impressions are required to elicit a certain level of response. This information can be used in setting personalized frequency capping levels for brand emotional campaigns, for instance.

In some embodiments, users generate observable events through, for example, cookied sessions, or logged-in sessions, which can be more reliable. Offline and online event information could be collected and used in creating an emotional profile of the user, which can then be used in assigning or classifying the user into most likely emotional states across a pool of standard human emotions, perhaps using a probability distribution, for example.

In some embodiments, advertisers can create specific advertisements within a campaign advertisement group, for specific emotional states, and then target users in those states. User responses to advertisements can be collected across many emotional states. This information can be analyzed to provide feedback to advertisers on the states that elicit the most favorable response for the advertisers. In some embodiments, advertisers are further provided one or more indices, such as a favorability index or sensitivity index, that indicates to them how favorably their brand in perceived, relative to others, and relative to their own levels in the past. Furthermore, the advertisers can be provided with an indication of how strongly this perception is affected when users are exposed to any negative or positive brand association.

In some embodiments, generally, backend systems are updated or modified to incorporate this additional form of targeting attribute, which can be done in a way that is generally similar to that used for other forms of targeting. As such, emotional targeting can provide a natural extension of the targeting concept, applicable to brand advertisers as well as other advertisers, such as sponsored search advertisers, and content or service providers or facilitators generally, potentially including any form of media or content.

As indicated above, some embodiments of the invention relate to emotional mapping. In some embodiments, various forms of input or information are utilized in classifying users into emotional states. Some embodiments utilize a combination of user initiated action, indirect associations, and a variety of compelling services to solicit user engagement, with an aim of collecting valuable information and accurately predicting users' emotional states. Emotional sensitivity profiles can be constructed to help predict the factors and extent to which specific events affect users' emotional states. Emotional state transition models can be constructed to help predict how long a user stays in an emotional state, and the emotional states that follow.

In some embodiments, learning techniques are utilized in emotional mapping-associated efforts. For instance, this can include using models including machine learning models, structured learning techniques utilizing a panel of users or employees for emotional labeling of properties, etc. Unstructured learning techniques can also be utilized, including tracking user activities and using clustering in connection with this information in assigning users to emotional profiles, etc.

In some embodiments, generally, online mechanisms are provided that are effectively emotionally aware, and enable estimating the level of, and collecting of, valuable feedback on emotional associations that are favorable or unfavorable, or are effective or ineffective. Furthermore, this can be facilitated by constructing and providing to users valuable features that enable or facilitate emotional classification, which can be based on, for example, direct inputs, or indirect associations with emotional states.

In some embodiments, user interaction with properties, services and applications online provide a rich source of emotional classifier information. No two users are alike in their sensitivities or responsiveness to environmental stimulus. However, grouping or clustering users into emotional profiles can provide a mechanism to determine their most likely emotional response to environmental stimulus. Furthermore, profiles can help allow prediction of user actions that reflect users' tendencies to belong to an emotional state, given observations regarding the users' activities on various domains. As such, in some embodiments, users are classified based on input including information and factors such as environmental conditions, user activity profiles, specific activity levels, and content choices or selections, potentially among other things.

One source of user input is user activity levels on various platforms, which may, for example, fluctuate and reflect a user's underlying emotional state or mood. Statistical input information on users' activity levels can be used in helping classify their emotional states, with varying degrees of certainty. Furthermore, state transition models can be used in predicting how long a user is likely to remain in one activity, which activities may follow, etc.

Activity and activity level-associated inputs can include, for example, user comments, in association with or submitted to news articles, pictures, rich media, etc. Other inputs include reviews, such as, for example, reviews submitted in association with dining, entertainments travel service providers, etc. Still other inputs can include purchases or conversions, whether online or offline, and levels of such activities relative to regular patterns. Furthermore, other inputs can include personal communications, including, for example, email, instant messaging, etc. Additionally, social interactions provide another source of input, including, for example, status or vitality updates, visits, connections made, pictures or photos viewed, etc.

In some embodiments, features can be constructed based on activity metrics and used as inputs in classifying users into user profiles that can be associated with a specific emotional model. The emotional model can indicate or reflect a user's emotional bias, sensitivity to emotional stimulus, and propensity to be and remain in particular emotional states.

Another source of inputs can include user content choices and related information, such as associated environmental or circumstantial information. Users often actively select content, which can provide direct rich signals for emotional mapping through content associations, more so in certain domains than in others. One source of such input can include user selection of content such as through a portal, including selected content, articles, links, rich media, etc. Another source includes entertainment choices and related information. For example, this can include selected songs or artists, songs in a playlist, shared songs, movie trailers viewed, movie reviews read, movies reviewed, favorite stars, news about celebrities, etc. Another source includes sports-related choices and related information, including performance of favorite teams (which can distinctly affect some users' moods), favorite stars and their careers, local team performance, etc.

Various other personal content-related selections and associations also can be factored in. For example, another source of input includes financial-related choices and information, such as performance of stock market indices, specific stocks tracked by a user, portfolio performance, etc. Weather-related selections and information provide another source of input. For instance, this can include the weather in a user's location, perhaps relative to normal or to the user's native location. Another source of inputs includes health-related choices and information. This can include, for instance, conditions searched, research alerts tracked, severity of a condition (for example, mild and temporary versus critical or chronic), and relation of patient to user (for example, self versus friend or family). Astrology-related choices and information provide another source of inputs. Such inputs can include predicted fortunes or misfortunes and the user's interest level in horoscope. Another source of inputs includes travel-related choices and information. Such inputs can include, for example, researching destinations, a planning phase for travel, being in-transit or in the middle of business travel or vacation, having just completed travel, shared pictures and reviews, etc. Various other personal choices and related information provide another sources of inputs. Such inputs can include, for example, activity on personal dating sites, successful outing, dates, etc.

Generally, each of the various types of inputs, in isolation or combination, can aid in predicting the emotional receptiveness and likely emotional state of the user. This can help enable selection of more relevant advertisements and content to target to users.

In some embodiments, to enable and incentivize users to share a greater part of their online world, compelling, valuable, or useful services are offered (or entities that offer such services could be partnered with, etc.), which can elicit stronger and richer signals for use in emotional mapping.

For example, compelling services could include services in connection with users' daily commute. For instance, users could be offered a service to help them manage their daily commute, in exchange for detailed information, such as about how difficult or frustrating it was. This could include, for instance, GPS-associated real-time alerts, etc.

Playlist services, such as music playlist services, could provide another compelling service. This could include, for example, allowing users to provide a seed song, and providing the use with similar songs, emotionally-associated songs, etc., as well as allowing users ongoing interaction with the playlist, such as by skipping songs, giving thumbs up, etc. All the while, the user is providing trackable, emotional state-relevant information.

Another form of compelling service, allowing tracking of valuable emotional state information, could include services relating to collocation or meeting of friends, etc. For example, alerts could be provided to users when friends or colleagues are nearby or in the same city, etc. Services could also be provided to facilitate planning, meeting, collocating with associates, logistics depending on the user's activity, etc.

Assisting users leading up to and performing major purchases or acquisitions can be another form of compelling service. For instance, this can include, in exchange for information on the user's intentions, assisting the user by providing alerts, pricing information, etc. Information such as what the user is planning to acquire (luxury good, etc.), can provide useful emotional insight.

Another area of compelling services can include social planning and follow-up. This can include assisting a user in planning and managing any social event. It can further include assisting the user in follow-up such as managing pictures, social networking afterward including stories and comments, etc. Social settings provide an opportunity to tap into the viral nature of emotions online.

As indicated above, some embodiments of the invention relate to aspects associated with the emotional Web. For instance, some embodiments of the invention provide techniques to allow harnessing of the rich emotional user signals from social and personal realms online. In some embodiments, the emotional Web can be considered to include, among other things, the infrastructure, models and other elements necessary to harness the often latent emotional signal from, for example, all that is active on the Web. This includes, for instance, social networks, social media, content, articles, blogs, etc. Social networks, for instance, can provide a rich bed of emotional signals. Increasingly, users want to share emotions and emotional experiences, yet the tools and constructs available to facilitate such have been limited. As such, an opportunity is available to provide tools for users to express emotions and emotional experiences, and underneath that to provide standard semantics to chart out the emotional realm that is becoming so active.

For all the increasing involvement of users and companies in social networking space, effective ways to monetize it have proved elusive. Some embodiments of the invention include harnessing the rich emotional signals available from social networks, and using such signaling in emotionally targeting users, for better advertisement and content performance leading to better associated monetization.

Some embodiments of the invention provide tools and constructs to allow users to better express emotion and emotional experiences on the Web, and to beacon such to allow tracking and direct measurement on the emotional signals produced.

In some embodiments, emotional labels or tags are applied to content, which is currently classified using semantic classifiers. Semantic labels, whether exact, derived, categorical, etc., are essentially literal, and fail to capture the emotional response that content may invoke. In some embodiments, by allowing users to attach beaconed emotional tags using new expressive constructs, users are allowed to help drive the emotional Web with much needed fuel to power itself to relevance.

Social networking, in particular, allows rich emotional signaling. Many features can be defined from measuring and analyzing such signals, including, for example, how fast someone responds to an emotional expression, the degree or intensity of response, what emotions were evoked when sharing a link or an article, etc.

Some embodiments of the invention include a recognition that certain semantic Web constructs can be analogized with or extended to the emotional Web. Ranking of Web pages, for instance, can be analogized with metrics such as, for example, emotional elasticity, personal evokability, personal sensitivity profiles, etc., which help predict a user's response to emotional signals online. Social events can be analogized with links within Web pages, allowing endorsement or qualification of other emotional signals. Exact versus non-exact semantic matching can be analogized with direct versus indirect emotional signaling.

As such, some embodiments of the invention, overall, include, among other things, defining standards for classifying or assigning elements of the Web in emotional dimensions. Constructs can be generated and utilized to digitally capture emotional expressions, directly and indirectly. Elements such as sites, content, etc. can be classified or assigned in emotional terms. Emotional or emotionally dimensioned advertising products can be provided to advertisers, including brand advertisers. Spread of emotional signals can be tracked as a way to predict emotional waves across a group of Web users. All of the foregoing, among other things, can be used in facilitating emotional targeting of users. Furthermore, advertisers, for example, can be provided with feedback on emotional associations that favor the their brands, as well as the receptiveness of users in various emotional states to such things as noticing, identifying, sharing and advocating their brands.

As indicated above, some embodiments of the invention relate to emoticlips some embodiments, emoticlip can include a media segment designed at least to facilitate communication of an emotional state or an emotional experience. In some embodiments, an emoticlip can include a rich media segment. Herein, the term "rich media segment" is intended to broadly include part or all of any rich media, rich media item, rich media file, etc. Rich media can include audio, video, or both, among other things. Furthermore, as used herein, the term "segment" is not intended to be limited to parts or portions of a whole, but can include, for example, portions or the whole itself. In some embodiments, emoticlips, including customized or personalized versions thereof, are associated with particular emotional states, such as emotional states that are part of a set or network of particular emotional states. Emoticlips could be provided and used by online users, publishers, or other entities.

In some embodiments, emoticlips represent part of an evolutionary leap forward for emotional expression in the digital world. In some embodiments, emoticlips are utilized to provide constructs that communicate a powerful sharable or shared emotion or emotional experience. Emoticlips can be tracked and help allow advertisers to associate with the right emotions when advertising online, such as to maximize advertisement performance and monetization from advertising.

Some embodiments of the invention include a recognition that certain types of rich media elicit precise and powerful emotions among a broad populace, and can be shared among groups of very close users. In a world that is becoming increasingly expressive and eager to share, digitizing such emotional expressions can generate very strong emotional signals for targeting, including targeting of advertising and content, and including brand advertising.

In some embodiments, emoticlips can include a brief media item or clip, such as a clip that is ten or five seconds in length or less (although other lengths are contemplated). The term clip, as used herein, is not intended to be limited to parts of a whole, but can include, for example, portions or the hole itself. For example, an emoticlip can include a clip from a movie, movie scene, song, hymn, tune, soundtrack, animation, video, pictures, etc. In some embodiments, for example, emoticlips can allow users to express emotions or emotional experiences that can inadequately be expressed using other constructs or tools.

In some embodiments, emoticlips are offered globally, but can be included within standardized sets, collections, or libraries that include, for each of a number of regions, contextually and emotionally relevant emoticlips. Local users can be provided with an opportunity to subscribe to such libraries or portions thereof. In some embodiments, emoticlips can be customized or personalized, which can include, for example, among other things, adding personalized portions such as rich media portions, snippets, etc.

In some embodiments, keyboard shortcuts or other conveniences can be provided to allow users to insert or embed emoticlips into any form of media, such as into emails, instant messaging, status or vitality updates, social networking communications, posts, blogs, tweets, electronic or digital documents on the Web or desktop, ebooks such as ebooks distributed over the Web, etc.

In some embodiments, emoticlips both allow users to express emotions and emotional experiences, and help provide an emotional targeting space to allow advertisers, for example, to emotionally target users, obtain emotional feedback, and tune campaigns such as brand campaigns accordingly.

In some embodiments, to introduce and initially invigorate interest, a small library of emoticlips could be floated to users, or a group of users. Each emoticlip could be provided with a unique identifier, a unique shortcut key, and an associated emotional state, which can be an emotional state of a set or network of particular emotional states. Emoticlip usage can be tracked, such as by beaconing services. The information obtained can be used, for example to build emotional statistics and metrics on users and groups of users. In some embodiments, interaction or association with emoticlips, such as playing, sharing, etc., produces a trackable event, which can be used in emotional targeting, to build a user emotional profile, etc.

In some embodiments, media companies could be encouraged or incentivized to include emoticlips, such as along with promotional material, such as ringtones, video games, clips or soundtracks from movies, etc. Furthermore, users of social media and social networking sites could be provided with and encouraged to use emoticlips. Furthermore, users or other parties could be provided with tools in connection with emoticlips, such as tools to create, customize, save, download emoticlips, design and upload new emoticlips to the network, etc.

While the invention is described with reference to the above drawings, the drawings are intended to be illustrative, and the invention contemplates other embodiments within the spirit of the invention.

The invention claimed is:

1. A method comprising:
using one or more computers, obtaining and storing a first set of information comprising a set of emotional states with which online elements may be associated;
using one or more computers, obtaining and storing a second set of information comprising information relating to a set of online elements;
using one or more computers, based at least in part on the second set of information, assigning each of the set of online elements to at least one associated emotional state, of the set of emotional states;
using one or more computers, obtaining and storing a third set of information comprising information relating to online activity of a user in association with at least one online element of the set of online elements, and comprising an emotional state to which the at least one online element of the set of online elements is assigned;
using one or more computers, based at least in part on the third set of information, classifying the user into at least one emotional state of the set of emotional states;
presenting the user with an online advertisement based at least in part on the at least one emotional state, of the set of emotional states, into which the user is classified; and
based at least in part on at least one direct online activity of the user and at least one indirect online activity of the user, predicting an emotional state that the user is likely to be in at a particular time at which, or during a particular period of time during which, the online advertisement is anticipated to be served, wherein the at least one direct online activity of the user includes one or more of usage, usage frequency, extent of personalization, sharing of emoticons, and sharing of emoticlips, and wherein the at least one indirect online activity of the user includes one or more of visits to specific user post, user review or blog entry domains or Web sites, and engagement with specific user post, user review or blog entry domains or Web sites.

2. The method of claim 1, wherein obtaining and storing a first set of information comprising a set of emotional states into which users may be classified comprises obtaining and storing a first set of information comprising a set of emotional states representing a spectrum of human emotions.

3. The method of claim 1, wherein obtaining and storing a first set of information comprising a set of emotional states into which users may be classified comprises obtaining and storing a first set of information comprising a network of nodes in which the nodes represent emotional state categories.

4. The method of claim 1, wherein comprising obtaining and storing a first set of information comprising a set of emotional states into which users may be classified comprises obtaining and storing a first set of information comprising a hierarchical network of nodes, including subnodes, in which the nodes represent emotional state categories, including subcategories.

5. The method of claim 1, comprising obtaining and storing a second set of information comprising information relating to a set of online elements, wherein online elements comprise Internet-based items and events.

6. The method of claim 1, comprising obtaining and storing a second set of information comprising information relating to a set of online elements, wherein online elements comprise user-generated content or messaging, and wherein messaging can include instant messaging and blogs.

7. The method of claim 1, comprising obtaining and storing a second set of information comprising information relating to a set of online elements, wherein online elements comprise user interaction associated with at least a social networking Web site or service.

8. The method of claim 1, comprising obtaining and storing a second set of information comprising information relating to a set of online elements, wherein online elements comprise emoticlips.

9. The method of claim 1, wherein assigning each of the set of online elements to at least one associated emotional state, of the set of emotional states, comprises assigning each of the online elements to at least one emotional state determined to be reflected or represented by the online element of the set of online elements.

10. The method of claim 1, wherein classifying the user into at least one emotional state of the set of emotional states comprises classifying the user into the emotional state associated with the at least one online element of the set of online elements.

11. The method of claim 1, wherein obtaining and storing a third set of information comprising information relating to online activity of a user in association with at least one of the online elements comprises obtaining and storing information relating to activities initiated by the user and information relating to content choices of the user.

12. The method of claim 1, comprising tagging or labeling online elements with associated emotional states.

13. The method of claim 1, comprising utilizing a machine learning technique in tagging or labeling online elements with associated emotional states.

14. The method of claim 1, comprising utilizing structured and unstructured learning techniques in tagging or labeling online elements with associated emotional states.

15. A system comprising:
one or more server computers coupled to a network; and
one or more databases coupled to the one or more servers;
wherein the one or more server computers are for:
  obtaining and storing, in at least one of the one or more databases, a first set of information comprising a set of emotional states with which online elements may be associated;
  obtaining and storing, in at least one of the one or more databases, a second set of information comprising information relating to a set of online elements;
  based at least in part on the second set of information, assigning each online element, of the set of online elements, to at least one associated emotional state, of the set of emotional states;
  obtaining and storing, in at least one of the one or more databases, a third set of information comprising information relating to online activity of a user in association with at least one online element of the set of online elements, and comprising an emotional state to which the at least one online element of the set of online elements is assigned;
  based at least in part on the third set of information, classifying the user into at least one emotional state of the set of emotional states;
  presenting the user with an online advertisement based at least in part on the at least one emotional state, of the set of emotional states, into which the user is classified; and
  based at least in part on at least one direct online activity of the user and at least one indirect online activity of the user, predicting an emotional state that the user is likely to be in at a particular time at which, or during a particular period of time during which, the online advertisement is anticipated to be served, wherein the at least one direct online activity of the user includes one or more of usage, usage frequency, extent of personalization, sharing of emoticons, and sharing of emoticlips, and wherein the at least one indirect online activity of the user includes one or more of visits to specific user post, user review or blog entry domains or Web sites, and engagement with specific user post, user review or blog entry domains or Web sites.

16. The system of claim 15, wherein the one or more server computers are coupled to the Internet.

17. The system of claim 15, comprising utilizing an emotional profile of the user in determining an emotional pattern of the user.

18. A non-transitory computer readable medium or media containing instructions for executing a method comprising:
  using one or more computers, obtaining and storing a first set of information comprising a set of emotional states with which online elements may be associated;
  using one or more computers, obtaining and storing a second set of information comprising information relating to a set of online elements, the set of online elements comprising Internet-based content and events;
  using one or more computers, based at least in part on the second set of information, assigning each of the set of online elements to at least one associated emotional state, of the set of emotional states, comprising utilizing tagging or labeling in assigning each of the online elements, of the set of online elements, to at least one emotional state, of the set of emotional states, determined to be reflected or represented by the online element of the set of online elements;

using one or more computers, obtaining and storing a third set of information comprising information relating to online activity of a user in association with at least one online element of the set of online elements, and comprising an emotional state to which the at least one online element of the set of online elements is assigned, and comprising information relating to activities initiated by the user and information relating to content choices of the user;

using one or more computers, based at least in part on the third set of information, classifying the user into at least one emotional state of the set of emotional states;

presenting the user with an online advertisement based at least in part on the at least one emotional state, of the set of emotional states, into which the user is classified; and based at least in part on at least one direct online activity of the user and at least one indirect online activity of the user, predicting an emotional state that the user is likely to be in at a particular time at which, or during a particular period of time during which, the online advertisement is anticipated to be served, wherein the at least one direct online activity of the user includes one or more of usage, usage frequency, extent of personalization, sharing of emoticons, and sharing of emoticlips, and wherein the at least one indirect online activity of the user includes one or more of visits to specific user post, user review or blog entry domains or Web sites, and engagement with specific user post, user review or blog entry domains or Web sites.

\* \* \* \* \*